Jan. 3, 1933.  H. L. KEISER  1,892,785
BARBED WIRE REEL
Filed Nov. 26, 1930  2 Sheets-Sheet 1

Inventor
H. L. Keiser
By Arthur H. Sturges
Attorney

Jan. 3, 1933.  H. L. KEISER  1,892,785
BARBED WIRE REEL
Filed Nov. 26, 1930  2 Sheets-Sheet 2

Inventor
H. L. Keiser
By *Arthur H. Sturges*
Attorney

Patented Jan. 3, 1933

1,892,785

UNITED STATES PATENT OFFICE

HERMAN L. KEISER, OF OMAHA, NEBRASKA

BARBED WIRE REEL

Application filed November 26, 1930. Serial No. 498,455.

This invention relates to barbed wire reels, for use with motor vehicle wheels, and more particularly to a wire drum, adapted for attachment to the wheel of a self-propelled vehicle for service in winding up barbed wire incident to the repair, removal or replacement of barbed wire fences, whereby the power of the engine of the vehicle is utilized for doing the work.

An important object of the invention is to provide a device of this type, which is attachable to practically all makes of automobiles or trucks, with a minimum expenditure of time and labor.

With the above and other objects in view which will appear as the description proceeds, the invention resides in the combination and arrangement of parts, and in the details of construction hereinafter described and claimed, it being understood that changes in the precise embodiment of the invention herein disclosed can be made within the scope of what is claimed, without departing from the spirit of the invention.

In the accompanying drawings: Figure 1 shows the invention in side elevation, parts being broken away and as applied to a section of a truck wheel, the latter being shown in a jacked up position.

Figure 1:
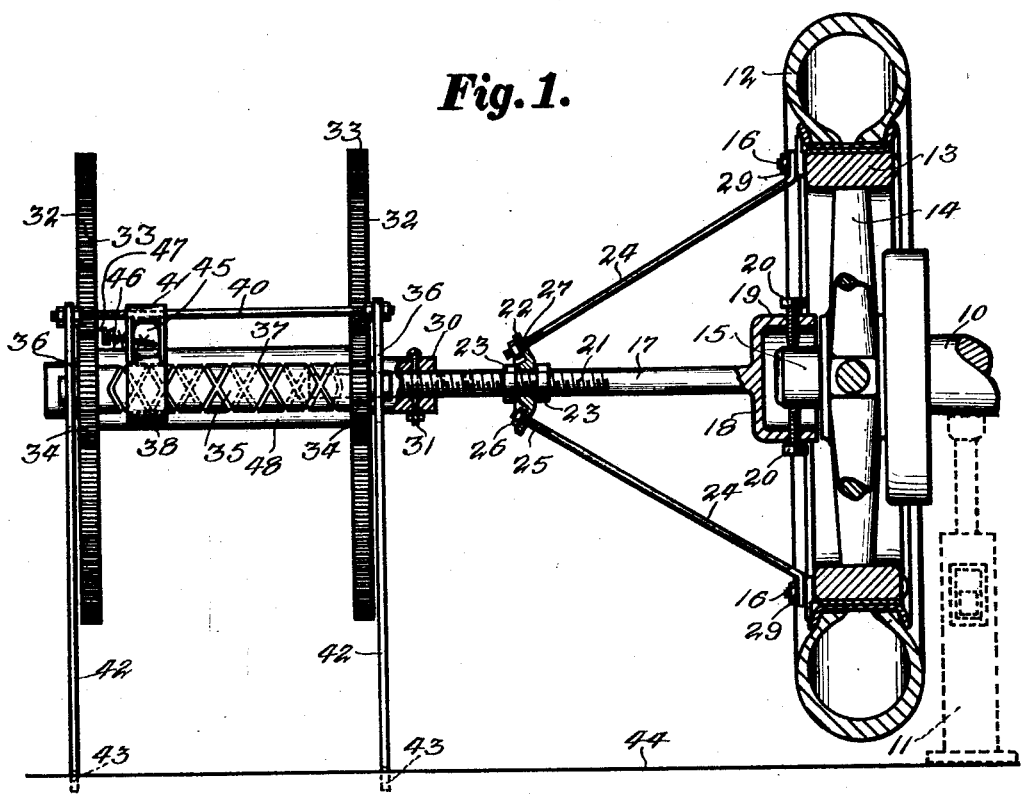
Figure 2:
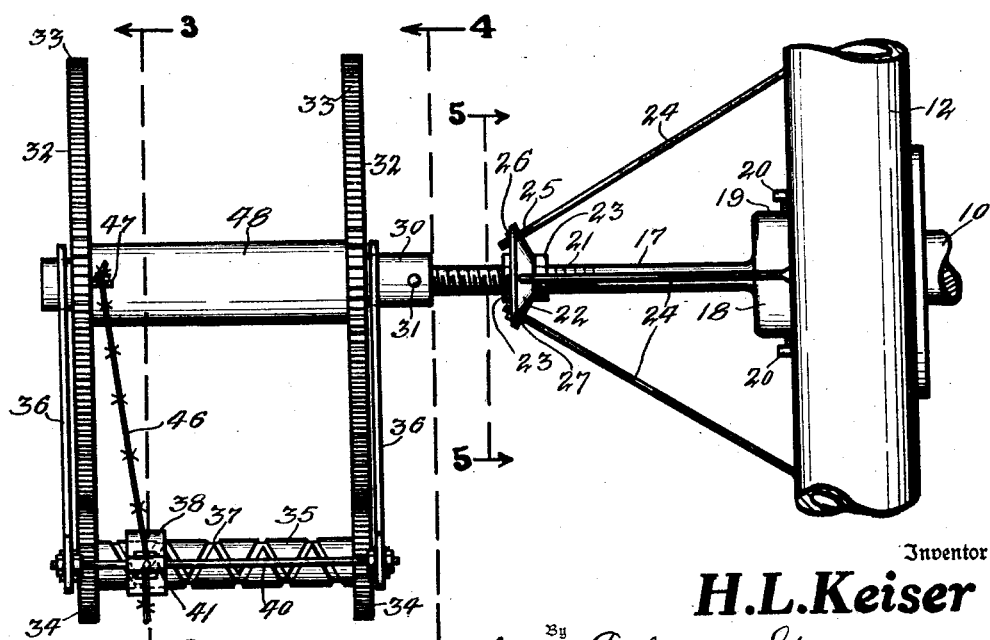
Figure 2 is a top plan view of the invention as illustrated in Figure 1.

Referring now to the drawings for a more particular description in which like numerals designate like or corresponding parts, 10 indicates the rear axle of a self-propelled vehicle, which is adapted to be supported above the ground by means of a jack 11, the latter being illustrated by means of dotted lines.

The axle 10 carries a wheel 12 provided with a felloe 13, spokes 14, a hub 15 and tire-bolts 16, the foregoing parts being conventional.

The new device comprises a shaft 17 provided with a cup-like end or socket 18, the annular flange 19 of which is provided with a plurality of set screws 20, by means of which the cup 18 is adapted to be centered in alinement with the hub 15 and carried thereby.

The outer end of the shaft 17 is provided with threads 21 for carrying a disc 22, the latter being adapted for adjustable longitudinal movements with respect to the shaft 17 and to be secured in an adjusted selected position by means of the lock nuts 23, one of which is positioned upon each side of the disc 22.

The disc 22 is secured by means of stay-rods 24 the outer ends of which are provided with screw threads 25 and nuts 26.

The disc 22 is provided with apertures 27, through which the stay-rods 24 may be inserted.

Figure 5:
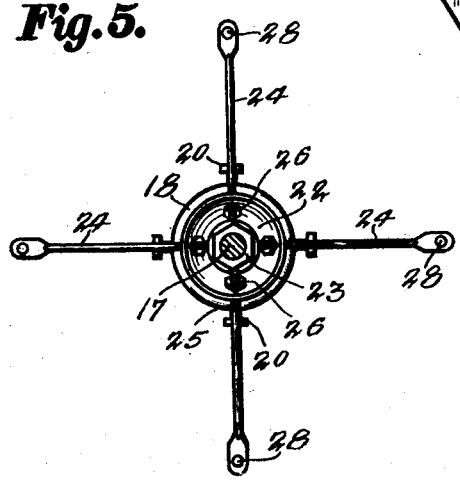
Figure 5 is a view taken along the line 5—5 of Figure 2 and showing the wheel attaching and supporting means for the reel.

As best shown in Figure 5, an end of each stay-rod is provided with an aperture 28, through which the heretofore mentioned lug-bolts 16 may project and be secured by means of the lug bolt nuts 29.

By this means the shaft 17 may be rigidly secured to the wheel and in alinement with the rear axle 10. To adjust the shaft the set screws 20 are first placed in position and the disc 22 moved to an approximate position. The stay-rods are now inserted through the apertures of the disc and fixed to the wheel, as heretofore described.

The shaft 17 is now alined by means of rotating the nuts 26 upon the ends of the stay-rods 24, in a manner whereby each stay-rod 24 is made taut and drawing the shaft 17 to a true alinement with the rear axle 10.

The reel is now secured to the shaft 17 as later described.

The reel includes a shaft 30, one end of which is interiorly threaded for registering with the threads 21 of the shaft 17 and when the said parts are secured together they are preferably locked by any suitable means, such as the bolt 31 which as shown in Figure 1, may extend through the shaft 30 and the shaft 17.

The shaft 30 carries end members 32, one or both of which may be provided with teeth 33, which are adapted to engage pinions 34 carried by a worm shaft 35.

The worm shaft 35 is held equi-distantly from the shaft 30 as to each end of the worm shaft 35 by means of the arms 36, which are pivotally mounted upon the shaft 30 and upon the shaft 35.

The worm shaft 35 is provided with an endless thread 37, which is preferably rectangular and is best shown by means of the dotted lines in Figure 1.

Figure 3:
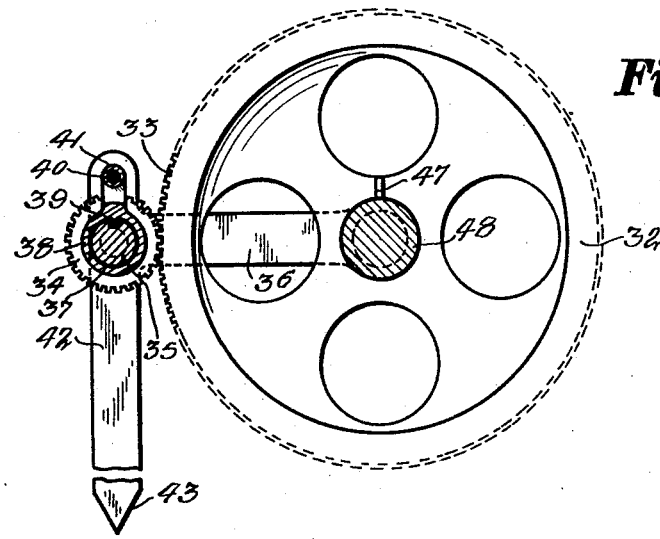
Figure 3 is a transverse vertical section of the reel, the view being taken substantially along the dotted line 3—3 of Figure 2.
Figure 4:
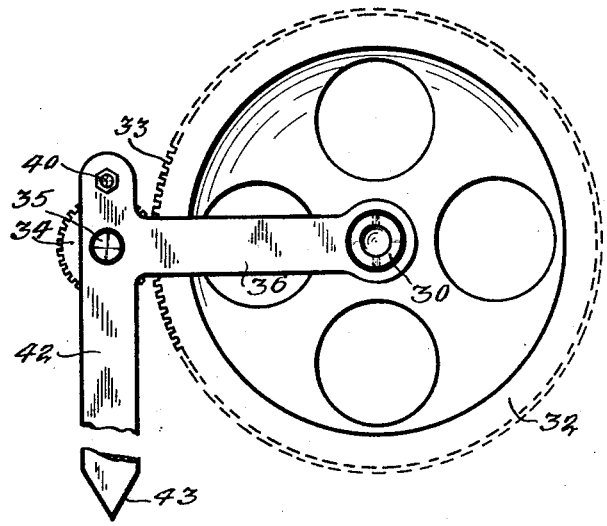
Figure 4 is an end elevation of the reel removed from its propelling shaft, the view being taken along the dotted line 4—4 of Figure 2.

A worm shaft follower 38 encircles the shaft and is carried thereon and is adapted to have longitudinal reciprocating movements upon the worm shaft by means of a lug 39 which, as best shown in Figure 3, is adapted to engage the threads 37 at all times.

The follower 38 is prevented from having rotary movements by means of a stationary shaft or rod 40, which is encircled by an arm 41, the latter being integral with the follower 38.

The rod 40 is carried by the standards 42.

The standards 42 are pivotally supported or carried by the ends of the worm shaft 35 and are integral with or attached rigidly to the heretofore mentioned arms 36.

The lower ground engaging ends of the standards 42 are preferably provided with sharp points 43, which are adapted to sink into or engage the ground 44, as best shown in Figure 1.

As also shown in Figure 1, the arm 41 of the follower 38, is provided with an aperture or eye 45, through which the barbed wire 46 may extend.

A drum 48 between the gear wheels or headers 32 is mounted on the shaft 30 and provided with an eye 47 for attaching the end of the wire 46.

In operation the rear wheel of the vehicle is jacked up as heretofore described and the parts attached, the vehicle being located closely adjacent to a fence or upon the side of a rod.

The barbed wire being loosened from all of the posts of the fence may now be reeled up as follows:—

The end of the wire 46 is secured to a detent 47 after the wire has been passed through the eye 45, the engine is now started and the transmission of the truck put in mesh; whereupon the rear wheel will revolve, thereby winding up the barbed wire upon the spool.

As the spool revolves the worm shaft 35 will be driven through the pinions 34, whereby revoluble movements will be imparted to the worm shaft 35.

The follower 38 will travel upon the worm shaft toward one end and after completing a stroke will return to the other end of the shaft and the operation will be there repeated, thereby causing the wire 46 to be laid in equal lamination and equi-distant spacing upon the reel hub, in a manner whereby the reel may be filled without crossing or tangling the wire.

By this means a large amount of wire may be placed upon one spool or reel, it being often the case that a single wire for a fence is as much as several miles in length.

From the foregoing description it is thought to be obvious that a barbed wire reel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice.

What is claimed is:—

1. In a barbed wire reel, a drum for receiving the wire, means whereby said drum may be driven from a jacked-up automobile wheel, arms extending pivotally from the drum, a worm shaft carried pivotally in said arms, means for driving said worm shaft from the drum, a follower movable on said worm shaft and receiving the wire therethrough, and supports connected to said arms and extending down from the worm shaft to the ground.

2. In a barbed wire reel, a rotatable drum for receiving the wire and having a drum shaft with a socketed end, an extension shaft removably received in said socketed end and extending coaxial of the drum shaft, means carried by said extension shaft for fitting over and being secured to the hub of a vehicle wheel, and adjustable means on the extension shaft for coupling with the rim portion of the vehicle wheel.

3. In a barbed wire reel, a rotatable wire-receiving drum, an extension shaft coupled to said drum and having a part for centering with respect to the hub of a vehicle wheel, said extension shaft being threaded, a disc movable along said extension shaft, lock nuts threaded on the extension shaft at opposite sides of said disc, stay rods carried adjustably by the disc and having their outer ends engaged with the rim bolts of the wheel.

4. In a barbed wire reel, a rotatable wire-receiving drum, an extension shaft coupled to the drum and to the hub of a jacked-up automobile wheel, a disc adjustable axially along said extension shaft and being bent away from the wheel and being perforated, stay rods loosely slipped through the perforations in said disc and having adjusting nuts on the ends thereof, said stay rods diverging toward the rim of the wheel and having angularly bent flattened and perforated ends for fitting over the bolts upon the rim of the vehicle wheel.

5. In a barbed wire reel, a rotatable wire-receiving drum, means for driving the drum and for partially supporting the same through the axis of the drum, arms pivoting about the drum axis and extending beyond the periphery of the drum, a worm shaft journaled in said arms, gear means between said drum and worm shaft, a follower mounted to feed axially along said worm shaft and having an eye to receive the wire therethrough, standards connecting with the outer ends of said arms and extending down and adapted to enter the ground, said standards also extending upwardly above the arms, a guide rod mounted in the upper extensions of said standards, and a guide arm on the follower running along said guide rod.

In testimony whereof, I have affixed my signature.

HERMAN L. KEISER.